United States Patent [19]

Sasaki et al.

[11] 4,324,586

[45] Apr. 13, 1982

[54] SEPARATION OF TELLURIUM FROM TELLURIUM-ANTIMONY-CONTAINING METAL OXIDE CATALYSTS

[75] Inventors: Yutaka Sasaki, Yokohama; Kiyoshi Moriya, Kanagawa, both of Japan

[73] Assignee: Nitto Chemical Industry Co., Ltd., Tokyo, Japan

[21] Appl. No.: 191,091

[22] Filed: Sep. 25, 1980

[30] Foreign Application Priority Data

Sep. 25, 1979 [JP] Japan ................................. 54-122815

[51] Int. Cl.³ ........................ C22B 30/02; C01B 19/02
[52] U.S. Cl. ........................................... 75/69; 423/88; 423/510
[58] Field of Search .............. 75/62, 69; 423/88, 508, 423/509, 510; 23/294

[56] References Cited

U.S. PATENT DOCUMENTS

| | | | |
|---|---|---|---|
| 679,330 | 7/1901 | Peterron | 423/88 X |
| 2,258,441 | 10/1941 | Bozarth | 423/88 |
| 2,661,280 | 12/1953 | Lebedeff et al. | 75/69 |
| 2,944,885 | 7/1960 | Wolff | 23/294 |
| 3,902,890 | 9/1975 | Sanimaya et al. | 423/509 X |
| 3,997,337 | 12/1976 | Pittie et al. | 423/508 X |

Primary Examiner—G. O. Peters
Attorney, Agent, or Firm—Sughrue, Mion, Zinn, Macpeak and Seas

[57] ABSTRACT

A tellurium component is separated from a tellurium-antimony-containing metal oxide catalyst by heating the catalyst at a temperature of about 900° C. to about 1,000° C. in a non-reducing atmosphere.

10 Claims, No Drawings

SEPARATION OF TELLURIUM FROM TELLURIUM-ANTIMONY-CONTAINING METAL OXIDE CATALYSTS

BACKGROUND OF THE INVENTION

1. Field of the Invention

This invention relates to a method for nearly completely separating a tellurium component from tellurium-antimony-containing metal oxide catalysts.

2. Description of the Prior Art

Antimony-containing metal oxide catalysts containing tellurium, or to which tellurium is added, are used in various chemical reactions. For example, catalysts containing iron, antimony, vanadium, molybdenum, tungsten, tellurium, etc. (as disclosed in U.S. Pat. No. 3,668,147), catalysts containing uranium, antimony, vanadium, molybdenum, tellurium, etc. (as disclosed in Japanese Patent Publication No. 19764/72), catalysts containing tellurium and antimony (as disclosed in British Pat. No. 1,168,279), catalysts containing iron, antimony, tellurium, arsenic, cobalt, etc. (as disclosed in U.S. Pat. No. 3,900,426), are known to be useful for oxidation, ammoxidation, oxidative dehydrogenation, etc., of olefins.

These catalysts usually contain about 5 to 70 wt% of antimony. It is, therefore, industrially important to efficiently recover antimony from such waste catalysts. When the waste catalysts contain no tellurium, antimony can easily be recovered as metallic antimony or antimony trioxide by known techniques, such as a molten reduction method, a mix-roasting method using stibnite, etc. However, when antimony is recovered from tellurium-containing waste catalysts by such known techniques, the metallic antimony or antimony trioxide obtained is often contaminated by tellurium (in some cases, in a concentrated state), and it has thus been difficult to recover high purity metallic antimony or antimony trioxide.

For this reason, it is desirable to recover antimony after the separation of tellurium therefrom. Such techniques, however, require nearly complete separation and removal of tellurium from the waste catalysts. Therefore, it has been desired to develop a technique which is relatively simplified and permits complete removal of tellurium from such waste catalysts.

To recover antimony and tellurium by operations of dissolution and precipitation using acids, alkalis, etc., from the above-described catalysts as used in the oxidation, ammoxidation, oxidative dehydrogenation, etc., of olefins, the operations of dissolution and precipitation generally must be repeatedly applied because the catalysts usually contain a plurality of metallic components. This naturally makes such processes complicated and cumbersome. Furthermore, difficulties are encountered in the separation of tellurium from antimony and, therefore, in the recovery of antimony.

In view of these problems, an improved method has already been proposed, as described in Japanese Patent Application (OPI) No. 152819/77 (the term "OPI" as used herein refers to a "published unexamined Japanese patent application"). According to this method, efficiently recovering the tellurium component alone by bringing tellurium-containing catalysts in contact with reducing substances within a specific temperature range.

However, when the tellurium component is intended to be recovered from waste catalysts containing antimony, the method suffers from the disadvantage that it is difficult to sublimate and recover the tellurium component selectively relative to the antimony component. When the temperature at which the waste catalyst is brought in contact with the reducing substance is about 700° C. or more, antimony trioxide sublimes together with the tellurium component. Therefore, difficulties arise in the separation of tellurium from antimony, and, consequently, in the recovery of tellurium. On the other hand, when the temperature is 700° C. or less, if substances having high reducing capabilities are employed, the tellurium recovery ratio (% Te recovered, based on total Te content) is significantly lowered.

Although the reason for the latter phenomenon is not clear, it is believed that during the reduction, metallic antimony covers the surface of catalyst particles or is alloyed, making the sublimation of the tellurium component difficult. Thus, even by this proposed method, it is not always easy to isolate tellurium from waste catalysts.

SUMMARY OF THE INVENTION

According to this invention, the object of which is to overcome the above-described problems, it has now been found that this object can be attained by heating a waste catalyst in a non-reducing atmosphere at a temperature of from about 900° C. to about 1,000° C. to vaporize the tellurium component separately from the antimony-containing catalyst.

This invention, therefore, provides a method of separating tellurium from a tellurium-antimony-containing metal oxide catalyst comprising heating the metal oxide catalyst in a non-reducing atmosphere at a temperature of from about 900° C. to about 1,000° C.

DETAILED DESCRIPTION OF THE INVENTION

Heating under the specific conditions according to this invention permits nearly complete separation and removal of the tellurium component from a tellurium-antimony-containing catalysts.

In view of the understanding in the prior art that in catalyst systems containing both tellurium and antimony it is better to avoid the reduction treatment using substances with high reducing capabilities at high temperatures, the findings of this invention that high tellurium component recovering ratios can be attained by heating in a non-reducing atmosphere and at high temperatures, and furthermore that the tellurium component can be separated and removed from the antimony-containing catalysts are completely unexpected.

Catalysts that can be treated according to this invention include antimony-containing metal oxide catalysts with tellurium added thereto. The term "catalysts" includes a catalyst containing as essential components tellurium and antimony, and catalysts containing various other elements in addition to the tellurium and antimony.

Elements other than tellurium and antimony that may be present include the following: (1) at least one selected from the group consisting of iron, cobalt, nickel, manganese, uranium, zinc, copper, cerium, tin, chromium and titanium, or (1)+(2) at least one selected from the group consisting of magnesium, calcium, strontium, barium, lanthanum, zirconium, vanadium, niobium, tantalum, molybdenum, tungsten, rhenium, ruthenium, osmium, rhodium, iridium, palladium, platinum, silver, cadmium, boron, aluminum, gallium, indium, thallium, silicon, germanium, lead, phosphorus, arsenic, bismuth, sulfur and selenium. Thus in one embodiment of this invention, the catalysts used contain at least one element of Group (1) and in another embodiment, both elements of at least one selected from Group (1) and at least one selected from Group (2).

While the exact state in which these elements are present in the catalysts is not clear, it is believed that each metallic element forms a specific complex oxide or a solid solution in combination with antimony since the catalyst preparation process includes high temperature heating. The state of the tellurium component existing in the catalysts is not clear, but it apparently combines with other elements, and does not exist as a free oxide.

The catalysts containing such elements are usually deposited on a carrier. In one aspect, some of the elements belonging to Group (1) and/or Group (2) may function as a carrier in the catalyst. For example, the titanium of Group (1), aluminum or silicon of Group (2) can be considered either as a catalyst component or as a carrier component. In particular, where they are considered as a carrier, they are typically introduced in the form of silica, alumina, silica-alumina, titania, or the like during the catalyst preparation process. Particular examples of carriers include kieselguhr, talc, asbestos and other natural or complex compounds.

Examples of metal oxide catalyst-containing elements as are described above are also described in the above-described patent specifications.

In general, the method of this invention is applied to waste catalysts. Since the waste catalysts are often contaminated by deposition of carbon, attachment of organic substances or the like, they can be subjected to suitable techniques such as washing, burning or the like prior to the application of the method of this invention in order to remove such deposits. If the size of the waste catalysts is not small, the catalyst can be pulverized to a suitable size in order to increase the area of contact with the non-reducing atmosphere and for evaporation. In the case of catalysts having diameters or widths not larger than several millimeters, pulverization is not necessary and the catalyst can be used as is in the method of this invention.

The heating operation as used in this invention will hereinafter be explained.

It is essential for this invention to carry out the heating in the non-reducing atmosphere. When the heating is carried out in the reducing atmosphere, the waste catalyst is rapidly reduced at high temperatures of about 900° C. to about 1,000° C. and the tellurium component substantially does not evaporate.

The term "non-reducing atmosphere" as used in this invention includes both an inert, i.e., non-oxidizing or reducing atmosphere and an oxidizing atmosphere. Examples of the (inert) atmospheres include nitrogen, argon, carbon dioxide, steam and other gases. As the oxidizing atmosphere, air, combustion gases, mixtures of air or combustion gases and the above-described inert gases, etc., can be used. While the combustion gases sometimes contain small amounts of uncombusted gases, i.e., reducing substances, if molecular oxygen is contained in an amount corresponding thereto, they can be included in the oxidizing atmosphere of this invention. The molecular oxygen content of the oxidizing atmosphere is preferably at least 5% by volume. Where the waste catalyst would be deteriorated by reduction, it is preferred to use oxidizing atmospheres, e.g., air.

To accelerate the evaporation of the tellurium component, it is desirable to carry out the heating in a flow of non-reducing atmosphere as described above, and the heating can be carried out under reduced pressure.

The heating temperature should be in the relatively limited range of about 900° C. to about 1,000° C. By the term "heating temperature" as used in this invention is meant the temperature of the waste catalyst.

To remove the tellurium component from the tellurium-antimony-containing catalysts by evaporation, the above temperature range is critical. When the waste catalyst is heated in the non-reducing atmosphere at temperatures of about 800° C. or less, almost no thermal changes or changes in weight are observed. However, when the heating temperature exceeds 800° C., the reduction in weight gradually occurs and at about 900° C., it becomes significant. In the vicinity of 1,000° C., an abrupt reduction in weight occurs. Investigation has revealed that the reduction in weight gradually occurring from the vicinity of 800° C. is corresponding to a process that the tellurium component existing as a compound or solid solution is segregated. In the range of about 800° C. to about 1,000° C., the tellurium component is selectively evaporated, during which the residual components of the catalyst remain stable. Temperatures below about 900° C. are not practical, because although the tellurium component is evaporated, its evaporation rate is very slow. On the other hand, the temperatures of above about 1,000° C. is not preferred in that the amount of the antimony component being evaporated as a vapor of antimony trioxide increases significantly.

The heating time may be shorter as the heating temperature is raised. In general, it is sufficient to heat the catalyst for from about 0.5 to 5 hours.

For the heating of the waste catalysts, any suitable heating equipment can be employed. In more detail, an internal or external heating type rotary kiln, a fluidized bed furnace, a box type furnace, etc., can be used. When the waste catalyst is a catalyst for use in a fixed bed, a fluidized bed furnace can be used. However, some catalysts cause caking, in which case it is preferred to use a rotary kiln.

To recover the evaporated tellurium component as a solid, it is necessary to bring the evaporated tellurium component in contact with gases, liquids or solids having lower temperatures than the evaporation temperature, particularly, temperatures of 800° C. or less. Furthermore, it is necessary to employ a technique to recover the tellurium component from, for example, the surface of solid onto which the tellurium component is deposited. The techniques employable for recovery of the tellurium component comprises cooling the tellurium component-containing gas and collecting the precipitates thereof. They are not limited to a specific method.

The thus-obtained tellurium component or tellurium-containing component can be used, as is or after being purified, as a final product of tellurium oxide or as a starting material for the production of tellurium-containing catalysts. After the removal of the tellurium component, the catalyst residue can be used for metallic antimony or antimony trioxide production process (because the tellurium component is nearly completely removed therefrom).

After the separation of the tellurium component by heating at temperatures of about 1,000° C. or less according to the method of this invention, the antimony component can be evaporated by raising the temperature to higher than 1,000° C. In this case, when the atmosphere is highly oxidizing, highly oxidized products of antimony are liable to result. Therefore, if it is desired to avoid the formation of such highly oxidized products of antimony, a non-oxidizing or slightly reducing atmosphere can be used.

The following examples and comparative examples are given to illustrate this invention in greater detail.

EXAMPLES 1 TO 5 AND COMPARATIVE EXAMPLES 1 TO 3

Five grams of the catalyst comprising iron, antimony, tungsten, tellurium, oxygen and silica and containing 8.5% by weight of iron, 46.2% by weight of antimony, 0.7% by weight of tungsten and 1.0% by weight of tellurium (10–200μ catalyst for use in a fluidized bed) was placed on a plate and heated in air by use of an electric furnace.

Processing conditions and analysis results of the catalyst composition are tabulated in Table 1.

TABLE 1

| Example | Processing Conditions Temperature (°C.) | Time (hours) | Catalyst Contents after Processing (% weight) Sb | Te |
|---|---|---|---|---|
| 1 | 900 | 10 | 46.1 | 0.05 |
| 2 | 950 | 5 | 46.3 | 0.01 |
| 3 | 950 | 8 | 46.4 | 0.00 |
| 4 | 950 | 10 | 46.2 | 0.00 |
| 5 | 1,000 | 3 | 45.7 | 0.00 |
| Comparative Example | | | | |
| 1 | 700 | 10 | 46.2 | 1.01 |
| 2 | 800 | 5 | 46.2 | 1.01 |
| 3 | 850 | 5 | 46.3 | 0.98 |

Metallic antimony was recovered from the catalyst subjected to the heating treatment under the conditions of Example 3 by a molten reduction method. The tellurium content of the recovered metal was 0.1% or less. On the other hand, when the catalyst was subjected to the same molten reduction method as above without first being subjected to the method of this invention, the tellurium content of the recovered metal was 7.3%.

EXAMPLE 6

Twenty grams of a catalyst comprising iron, antimony, tellurium, oxygen and silica and containing 10.3% by weight of iron, 41.5% by weight of antimony, and 2.5% by weight of tellurium (the pulverized product having particle diameters of 1 to 2 mm) was placed in quartz glass, raised in temperature in a stream of nitrogen (flow rate 10 l/hr) by use of an electric furnace and kept at 950° C. for 5 hours. The resulting tellurium component containing gas was charged into a condenser and cooled at a low temperature of from 600° to 200° C. to deposit a white powder of tellurium component at places outside the system. Composition analysis of the so-treated catalyst showed that the antimony and tellurium contents were, respectively, 42.9% and 0.2% by weight.

COMPARATIVE EXAMPLE 4

Twenty grams of a catalyst having the same composition as in Example 6 was placed in a quartz glass, raised in temperature in a stream of a mixed gas consisting of 5% by volume of propylene and 95% by volume of nitrogen (flow rate 10 l/hr) by use of an electric furnace and kept at 950° C. for 5 hours. Subsequently, the thus-treated catalyst was removed and heated in air at 600° C. for 5 hours. The composition analysis of the catalyst showed that the antimony and tellurium contents were, respectively, 30.4% and 1.9% by weight.

While the invention has been described in detail and with reference to specific embodiments thereof, it will be apparent to one skilled in the art that various changes and modifications can be made therein without departing from the spirit and scope thereof.

What is claimed is:

1. A method for separating tellurium from a tellurium-antimony-containing metal oxide catalyst comprising heating the tellurium-antimony-containing metal oxide catalyst at a temperature of from about 900° C. to about 1,000° C. in a non-reducing gaseous atmosphere to evaporate the tellurium component separately from the antimony-containing catalyst.

2. A method as in claim 1 wherein the tellurium-antimony-conatining metal oxide catalyst further contains at least one element selected from the group consisting of iron, cobalt, nickel, manganese, uranium, zinc, copper, cerium, tin, chromium and titanium.

3. A method as in claim 1 wherein the tellurium-antimony-containing metal oxide catalyst further contains at least one element selected from the group consisting of iron, cobalt, nickel, manganese, uranium, zinc, copper, cerium, tin, chromium and titanium, and at least one element selected from the group consisting of magnesium, calcium, strontium, barium, lanthanum, zirconium, vanadium, niobium, tantalum, molybdenum, tungsten, rhenium, ruthenium, osmium, rhodium, iridium, palladium, platinum, silver, cadmium, boron, aluminum, gallium, indium, thallium, silicon, germanium, lead, phosphorus, arsenic, bismuth, sulfur and selenium.

4. A method as in claim 1, 2, or 3 wherein the non-reducing atmosphere contains molecular oxygen and the concentration of the molecular oxygen is at least 5% by volume.

5. A method as in claim 1, 2, or 3 comprising heating the catalyst in an oxidizing atmosphere.

6. A method as in claim 5 wherein the oxidizing atmosphere is air.

7. A method as in claim 1, 2, or 3 wherein the catalyst is heated in a flow of non-reducing atmosphere.

8. A method as in claim 1, 2, or 3 wherein the heating is carried out for from about 0.5 to 10 hours.

9. A method as in claim 1, wherein said non-reducing gaseous atmosphere is an inert atmosphere selected from the group consisting of nitrogen, argon, carbon dioxide and steam.

10. A method as in claim 1, wherein said non-reducing gaseous atmosphere is an oxidizing atmosphere selected from the group consisting of air, combustion gases and a mixture of air or combustion gases and an inert gas.

* * * * *